(12) United States Patent
Aldersley

(10) Patent No.: US 10,913,334 B2
(45) Date of Patent: Feb. 9, 2021

(54) MOTOR VEHICLE

(71) Applicant: Bayerische Motoren Werke Aktiengesellschaft, Munich (DE)

(72) Inventor: Nicholas Aldersley, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/271,930

(22) Filed: Feb. 11, 2019

(65) Prior Publication Data

US 2019/0168589 A1   Jun. 6, 2019

Related U.S. Application Data

(63) Continuation of application No. PCT/EP2017/067897, filed on Jul. 14, 2017.

(30) Foreign Application Priority Data

Aug. 12, 2016   (DE) .................. 10 2016 215 093

(51) Int. Cl.
*B60J 5/10* (2006.01)
*B60J 5/04* (2006.01)
(Continued)

(52) U.S. Cl.
CPC ............... *B60J 5/107* (2013.01); *B60J 1/18* (2013.01); *B60J 5/0469* (2013.01); *B21D 39/028* (2013.01); *B62D 27/026* (2013.01)

(58) Field of Classification Search
CPC . B60J 1/18; B60J 5/107; B60J 5/0469; B21D 39/021; B21D 39/028; B62D 27/026; F16B 5/0096
See application file for complete search history.

(56) References Cited

U.S. PATENT DOCUMENTS 4,719,689 A * 1/1988 Yamamoto ............. B21D 39/02
156/295
8,899,658 B1 * 12/2014 Gangal ................... B60J 5/107
296/146.6
(Continued)

FOREIGN PATENT DOCUMENTS

CN        204222600 U        3/2015
DE   10 2006 033 751 B4    4/2008
(Continued)

OTHER PUBLICATIONS

International Search Report (PCT/ISA/210) issued in PCT Application No. PCT/EP2017/067897 dated Oct. 2, 2017 with English translation (seven pages).

(Continued)

*Primary Examiner* — Christine T Cajilig
(74) *Attorney, Agent, or Firm* — Crowell & Moring LLP

(57) ABSTRACT

A motor vehicle includes a tailgate which has an inner panel, a reinforcing component and an outer panel. The inner component or the outer component is flanged on an end portion, forming a cavity or intermediate space. An adhesive is placed in the intermediate space. An end portion of the non-flanged component is arranged in the intermediate space. An intermediate space is formed between an inner surface of the inner component and an inner surface of the outer component and is filled with adhesive. The end portion of the middle component present in each case is arranged in the intermediate space.

20 Claims, 2 Drawing Sheets

(51) Int. Cl.
  *B60J 1/18*   (2006.01)
  *B62D 27/02*  (2006.01)
  *B21D 39/02*  (2006.01)

(56) References Cited

U.S. PATENT DOCUMENTS

| | | | | |
|---|---|---|---|---|
| 10,286,762 | B2* | 5/2019 | Ogawa | B60J 5/0456 |
| 2007/0170751 | A1* | 7/2007 | Tanaka | B60J 5/0429 |
| | | | | 296/146.6 |
| 2010/0102589 | A1* | 4/2010 | Miyake | B60J 5/107 |
| | | | | 296/146.8 |
| 2010/0102590 | A1* | 4/2010 | Miyake | B60J 5/101 |
| | | | | 296/146.8 |
| 2010/0281940 | A1* | 11/2010 | Harrow | B21D 39/021 |
| | | | | 72/306 |
| 2012/0248810 | A1 | 10/2012 | Song et al. | |
| 2015/0008697 | A1* | 1/2015 | Inai | B60R 1/006 |
| | | | | 296/146.6 |
| 2015/0258764 | A1* | 9/2015 | Sa mannshausen | F16B 11/006 |
| | | | | 156/77 |
| 2016/0167495 | A1* | 6/2016 | Kamimura | B60J 5/0469 |
| | | | | 52/309.1 |
| 2016/0229464 | A1 | 8/2016 | Tanaka et al. | |
| 2016/0263971 | A1* | 9/2016 | Haselwanter | B60J 5/0469 |

FOREIGN PATENT DOCUMENTS

| | | | | |
|---|---|---|---|---|
| DE | 10 2008 060 930 A1 | 4/2010 | | |
| DE | 102010012114 A1 * | 10/2010 | | B60J 5/0469 |
| DE | 10 2009 059 984 A1 | 6/2011 | | |
| DE | 10 2010 025 877 A1 | 1/2012 | | |
| DE | 10 2012 204 783 A1 | 11/2012 | | |
| DE | 10 2012 205 594 A1 | 10/2013 | | |
| DE | 10 2013 108 890 A1 | 2/2015 | | |
| DE | 11 2015 000 066 T5 | 1/2016 | | |
| EP | 2 179 877 A1 | 4/2010 | | |
| EP | 2 529 856 A1 | 12/2012 | | |
| EP | 2781277 A1 * | 9/2014 | | B21D 39/028 |
| WO | WO 2014/037392 A1 | 3/2014 | | |
| WO | WO -2015137051 A1 * | 9/2015 | | B60J 5/0408 |
| WO | WO-2015137051 A1 * | 9/2015 | | B60J 5/0469 |

OTHER PUBLICATIONS

German-language Written Opinion (PCT/ISA/237) issued in PCT Application No. PCT/EP2017/067897 dated Oct. 2, 2017 (seven pages).

German-language Search Report issued in counterpart German Application No. 10 2016 215 093.6 dated Jul. 5, 2017 with partial English translation (nine pages).

* cited by examiner

MOTOR VEHICLE

CROSS REFERENCE TO RELATED APPLICATIONS

This application is a continuation of PCT International Application No. PCT/EP2017/067897, filed Jul. 14, 2017, which claims priority under 35 U.S.C. § 119 from German Patent Application No. 10 2016 215 093.6, filed Aug. 12, 2016, the entire disclosures of which are herein expressly incorporated by reference.

BACKGROUND AND SUMMARY OF THE INVENTION

The invention relates to a motor vehicle having a vehicle body component, which is constructed from an inner component, at least one middle component and an outer component, wherein the three components are connected to one another at their edges by way of a crimped connection and an adhesive connection.

A tailgate for a motor vehicle is already known. The tailgate has an inner component, which forms a supporting structure of the tailgate. The inner component points into an inner vehicle space, for example into a luggage compartment. An outer component is fastened to a circumferential edge or flange of the inner component. By way of example, the outer component can be fastened to the edge of the inner component by way of a crimped connection in combination with an adhesive connection. A reinforcing component, for example a die-cast component made of a light metal, can be arranged in a cavity between the outer component and the inner component.

It is an object of the invention to provide a motor vehicle having a vehicle body component in the case of which the connection between three components of the vehicle body component at circumferential, opposing edges is simplified.

A motor vehicle according to the invention has a vehicle body component, which is constructed from an inner component, at least one middle component and an outer component. The three components are connected to one another at their edges by way of a crimped connection and adhesive.

Advantageously, the inner component or the outer component is crimped at an end portion of an edge to form a cavity or intermediate space. Adhesive is filled in the intermediate space. An end portion of the non-crimped component is arranged in the intermediate space. An intermediate space is formed between an inner surface of the inner component and an inner surface of the outer component and is filled with adhesive. The end portion of the middle component present in each case is arranged in the intermediate space.

In an advantageous embodiment, the inner component and/or the outer component and/or the middle component is produced from a light metal or a light metal alloy.

The vehicle body component is advantageously a tailgate of a motor vehicle.

In an advantageous embodiment, the inner component is an inner panel, the outer component is an outer panel, and the middle component is at least one reinforcing component of the tailgate.

Advantageously, the middle component is a die-cast component made of a light metal or a light metal alloy.

In an advantageous embodiment, the die-cast part has a two-part or single-part form.

The tailgate advantageously has a through-opening for a rear window. The inner panel advantageously has a frame, which surrounds at least an upper portion of the through-opening for the rear window, wherein the frame of the inner panel is integrally connected to an inner panel body.

In an advantageous embodiment, the reinforcing component at least partially reinforces the frame of the inner panel.

Advantageously, the reinforcing component at least partially reinforces the frame of the inner panel and at least partially reinforces the inner panel body of the inner panel.

In an advantageous embodiment, the outer panel at least completely covers the frame of the inner panel and at least partially covers the inner panel body except for through-openings or recesses for rear lights.

A crimp radius (R) is advantageously in a range of 1 mm≤R≤3 mm.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
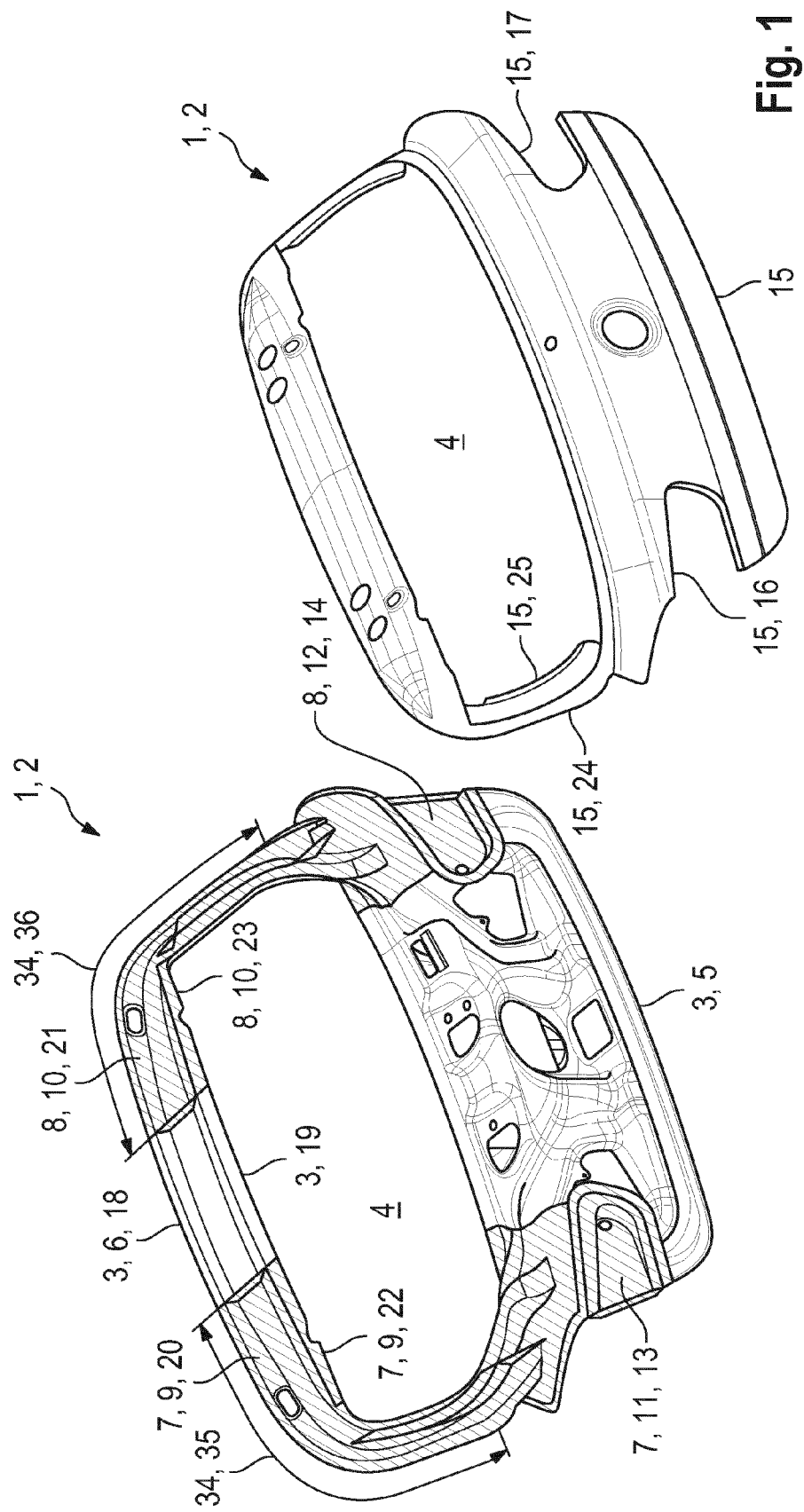
FIG. 1 is a perspective exploded view of a tailgate in two drawings, wherein the first drawing illustrates an inner panel with two reinforcing components and the second drawing shows an outer panel, wherein the outer panel covers the inner panel to the greatest possible extent in the assembled state.

FIG. 1 shows a vehicle body component 2 of a motor vehicle 1, which is constructed from an inner component 3, a middle component 7, 8 and an outer component 15. In the assembled state, the three components 3, 15, 7, 8 are connected to one another at their edges 18, 19; 24, 25; 20, 21 and respectively 22, 23 (shown in enlarged form in FIGS. 2 and 3) by way of a crimped connection and adhesive.

The vehicle body component 2 of the motor vehicle 1 which is shown in FIG. 1 is a tailgate. The inner component 3 is a three-dimensional inner panel 3 of the tailgate 2 which is known per se. In the embodiment shown, the inner panel 3 forms the supporting structure of the tailgate 2.

The inner panel 3 has a through-opening 4 for arranging a rear window (not shown). An inner panel body 5 is formed beneath the through-opening 4. A frame 6 is formed in one piece on the inner panel body 5 and surrounds the through-opening 4.

In the embodiment shown, two reinforcing components in the form of die-cast components 7 and 8 are arranged on the inner panel 3. In the embodiment shown, the two die-cast components 7 and 8 at least partially surround the frame 6 of the inner panel 3 of the tailgate 2 with U-shaped portions 9, 10.

A respective further die-cast component portion 11, 12 integrally adjoins the respective U-shaped portion 9, 10 of the respective die-cast component 7, 8. In the embodiment shown, a receptacle portion 13, 14 for rear lighting (not shown) is formed in the respective die-cast component portion 11, 12.

An outer panel 15 is illustrated at a distance from the inner panel 3, the latter being reinforced by the two die-cast components 7, 8. The outer panel 15 almost completely covers the inner panel 3, except for two recesses 16 and 17, for example. In the assembled state of the tailgate 2, the two recesses 16 and 17 of the outer panel 15 are arranged above the receptacle portions 13, 14 for the rear lighting.

The inner panel 3 has a circumferential outer edge or outer flange 18. Furthermore, a circumferential inner edge or inner flange 19 is formed on the inner panel 3 at the through-opening 4.

The two die-cast components 7, 8 each have an outer edge or outer flange 20, 21, which lies opposite to the respective opposing outer edge 18 of the inner panel 3. Furthermore, at the respective U-shaped portion 9, 10, the respective die-cast component 7, 8 has an inner edge or inner flange 22, 23 (shown in FIGS. 2 and 3). The inner edge or inner flange 22, 23 lies opposite to the respective portion of the inner edge 19 of the inner panel 3.

The outer panel 15 has a circumferential outer edge or outer flange 24. Furthermore, a circumferential inner flange 25 is formed in the region of the through-opening 4.

Figure 2:
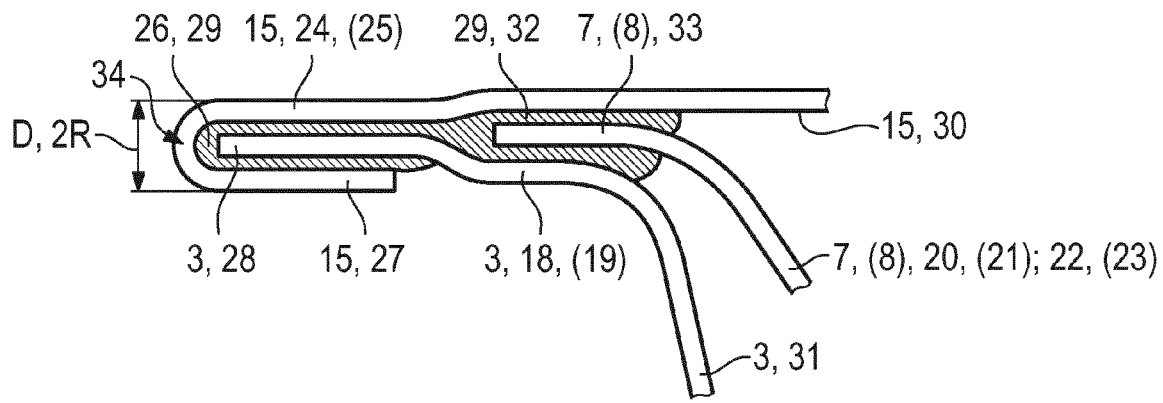
FIG. 2 is a sectional view of an edge region of the tailgate shown in FIG. 1 in an assembled state, wherein an adhesively bonded crimped connection of three edge regions is shown.

FIG. 2 shows a first embodiment of a crimped connection of three edges of a vehicle body component 2 in combination with an adhesive connection with a suitable adhesive 29. In FIG. 2, the respective edge 18, (19) of the inner panel 3, the respective edge 20, (21); 22, (23) of the respective die-cast component 7, 8 and the respective edge 27 of the outer panel 15 are connected to one another.

An edge portion 24, 25 of the outer panel 15 is crimped in a U shape to form a cavity or intermediate space 26, such that an end portion 27 of the outer edge 24, 25 of the outer panel 15 points in a direction toward an end portion 28 of the inner panel 3. A suitable adhesive 29 is introduced into the intermediate space 26, such that the end portion 28 of the inner panel 3 is adhesively bonded to the inner surface 30 of the outer panel 15 in the intermediate space 26.

A cavity or an intermediate space 32 is formed between an inner surface 30 of the outer panel 15 and an inner surface 31 of the inner panel 3. The intermediate space 32 is formed with such a shape and size that an end portion 33 of the respective edge 20, 21; 22, 23 of the respective die-cast component 7, 8 is held with a form fit in the intermediate space 32 between the inner panel 3 and the outer panel 15, and is adhesively bonded by way of the adhesive 29 located in the intermediate space 32 to the inner surface 30 of the outer panel 15 and the inner surface 31 of the inner panel 3.

Figure 3:
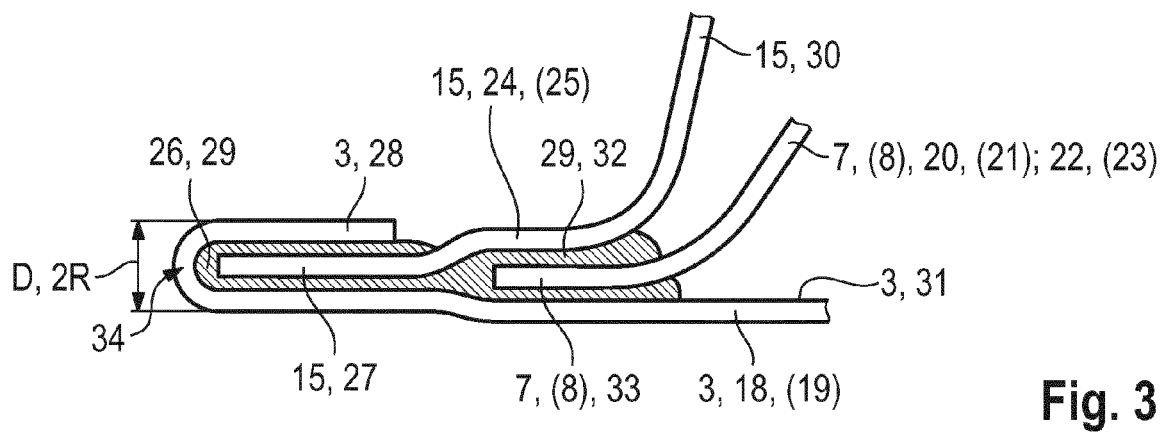
FIG. 3 is a sectional view corresponding to FIG. 2, wherein the sequence of the three components adhesively bonded to one another has been changed compared to FIG. 2.

FIG. 3 shows a second embodiment of a crimped connection of three edges of a vehicle body component 2 in combination with an adhesive connection. In FIG. 2, the respective edge 18, (19) of the inner panel 3, the respective edge 20, (21); 22, (23) of the respective die-cast component 7, 8 and the respective edge 27 of the outer panel 15 are connected to one another. In contrast to the first embodiment shown in FIG. 2, the end portion 28 of the inner panel 3 is crimped in a U shape to form the inner space 26.

The end portion 27 of the outer panel 15 is arranged in the intermediate space 26 formed by the crimped end portion 28 of the inner panel 3. Adhesive 29 is introduced into the intermediate space 26, such that the end portion 27 of the outer panel 15 is adhesively bonded to the inner surface 31 of the inner panel 3 in the intermediate space 26.

An intermediate space 32 is formed between the inner surface 30 of the outer panel 15 and the inner surface 31 of the inner panel 3 with such a shape and size that an end portion 33 of the respective edge 20, 21; 22, 23 of the respective die-cast component 7, 8 is held with a form fit in the intermediate space 32, and is adhesively bonded by way of the adhesive 29 located in the intermediate space 32.

In one embodiment, a single die-cast component serving as a reinforcing component is provided instead of two die-cast components 7, 8 serving as reinforcing components.

In one embodiment, both the inner panel 3 and also the outer panel 15 as well as the die-cast components 7, 8 or, respectively, the single-piece die-cast component are produced from a light metal, for example from an aluminum or an aluminum alloy.

The formation of intermediate spaces 26, 32 gives rise to a form-fitting positioning of the respective end portions arranged in the intermediate spaces 26, 32.

In the embodiments described in FIGS. 2 and 3, the end portion 33 of the respective middle component 7, 8 formed as a reinforcing component is spaced apart from the intermediate space 26. The end portion 33 of the middle component 7, 8 is likewise held with a form fit by the opposing portions of the inner panel 3 and of the outer panel 15.

The cavities or intermediate spaces 26, 27 can be filled with process reliability with adhesive 29. The positioning of the individual components or end portions 27, 28, 33 is simplified considerably.

A crimped flange 34, which arises by virtue of the bent end portion 28 of the inner panel 3 or by virtue of the bent end portion 27 of the outer panel 15, can also be produced over longer portions 35, 36 several centimeters in length.

In FIG. 1, the crimped portions 35, 36 are formed on the outer edge 18 of the inner panel 3 or, respectively, on the outer edge 24 of the outer panel 15. The size of the crimp radius R is small, since only two components, that is the inner panel 3 and the outer panel 15, are connected to one another, and the adhesive 29 takes up relatively little space. By way of example, the crimp radius (R) lies in a range of $1 \text{ mm} \leq R \leq 3 \text{ mm}$, i.e. the crimp diameter $D=2 \times R$ lies in a range of $2 \text{ mm} \leq D \leq 6 \text{ mm}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle body component, comprising:
   an inner component having an inner-component-edge with an inner-component-end-portion that is crimped to form an intermediate space therebetween;
   an outer component having an outer-component-edge with a non-crimped outer-component-end-portion arranged within the intermediate space so as to not contact the inner component, wherein a further intermediate space is formed between the inner component and the outer component;
   a middle component having a middle-component-edge with a middle-component-end-portion arranged in the further intermediate space but not the intermediate space so as to not contact the inner component or the outer component; and
   an adhesive that fills an intervening space that extends between the outer component and the middle component, and between the middle component and inner component, and thereby adheres the outer component and the middle component within the intermediate space and the further intermediate space, respectively.

2. The motor vehicle as claimed in claim 1, wherein the inner component, the outer component and/or the at least one middle component is produced from a metal or a metal alloy.

3. The motor vehicle as claimed in claim 1, wherein the vehicle body component is a tailgate of a motor vehicle.

4. The motor vehicle as claimed in claim 3, wherein the inner component is an inner panel, the outer component is an outer panel, and the at least one middle component is at least one reinforcing component.

5. The motor vehicle as claimed in claim 4, wherein the at least one middle component is a die-cast component made of a metal or a metal alloy.

6. The motor vehicle as claimed in claim 5, wherein the die-cast part has a two-part or single-part form.

7. The motor vehicle as claimed in claim 4, wherein the tailgate has a through-opening for a rear window, the inner panel has a frame, which surrounds at least an upper portion of the through-opening for the rear window, and the frame of the inner panel is integrally connected to an inner panel body.

8. The motor vehicle as claimed in claim 7, wherein the reinforcing component at least partially reinforces the frame of the inner panel.

9. The motor vehicle as claimed in claim 7, wherein the reinforcing component at least partially reinforces the frame of the inner panel and at least partially reinforces the inner panel body of the inner panel.

10. The motor vehicle as claimed in claim 7, wherein the outer panel at least completely covers the frame of the inner panel and at least partially covers the inner panel body except for through-openings or recesses for rear lights.

11. The motor vehicle as claimed in claim 1, wherein a crimp radius of the crimped inner-component-end-portion is $1\ mm \leq R \leq 3\ mm$.

12. A motor vehicle having a vehicle body component, comprising:
   an outer component having an outer-component-edge with an outer-component-end-portion that is crimped to form an intermediate space therebetween;
   an inner component having an inner-component-edge with a non-crimped inner-component-end-portion arranged within the intermediate space so as to not contact the inner component, wherein a further intermediate space is formed between the inner component and the outer component;
   a middle component having a middle-component-edge with a middle-component-end-portion arranged in the further intermediate space but not the intermediate space so as to not contact the inner component or the outer component; and
   an adhesive that fills an intervening space that extends between the outer component and the middle component, and between the middle component and inner component, and thereby adheres the outer component and the middle component within the intermediate space and the further intermediate space, respectively.

13. The motor vehicle as claimed in claim 12, wherein the vehicle body component is a tailgate of a motor vehicle.

14. The motor vehicle as claimed in claim 13, wherein the inner component is an inner panel, the outer component is an outer panel, and the at least one middle component is at least one reinforcing component.

15. The motor vehicle as claimed in claim 14, wherein the at least one middle component is a die-cast component made of a metal or a metal alloy.

16. The motor vehicle as claimed in claim 15, wherein the die-cast part has a two-part or single-part form.

17. The motor vehicle as claimed in claim 14, wherein the tailgate has a through-opening for a rear window, the inner panel has a frame, which surrounds at least an upper portion of the through-opening for the rear window, and the frame of the inner panel is integrally connected to an inner panel body.

18. The motor vehicle as claimed in claim 17, wherein the reinforcing component at least partially reinforces the frame of the inner panel.

19. The motor vehicle as claimed in claim 17, wherein the reinforcing component at least partially reinforces the frame of the inner panel and at least partially reinforces the inner panel body of the inner panel.

20. The motor vehicle as claimed in claim 12, wherein a crimp radius of the crimped inner-component-end-portion is $1\ mm \leq R \leq 3\ mm$.

* * * * *